Aug. 7, 1923.
A. N. TUCKER
APPARATUS OR DEVICE FOR USE WHEN TEACHING OR PRACTICING SHOOTING,
PARTICULARLY GAME SHOOTING
Filed June 27, 1921   2 Sheets-Sheet 1
1,463,931
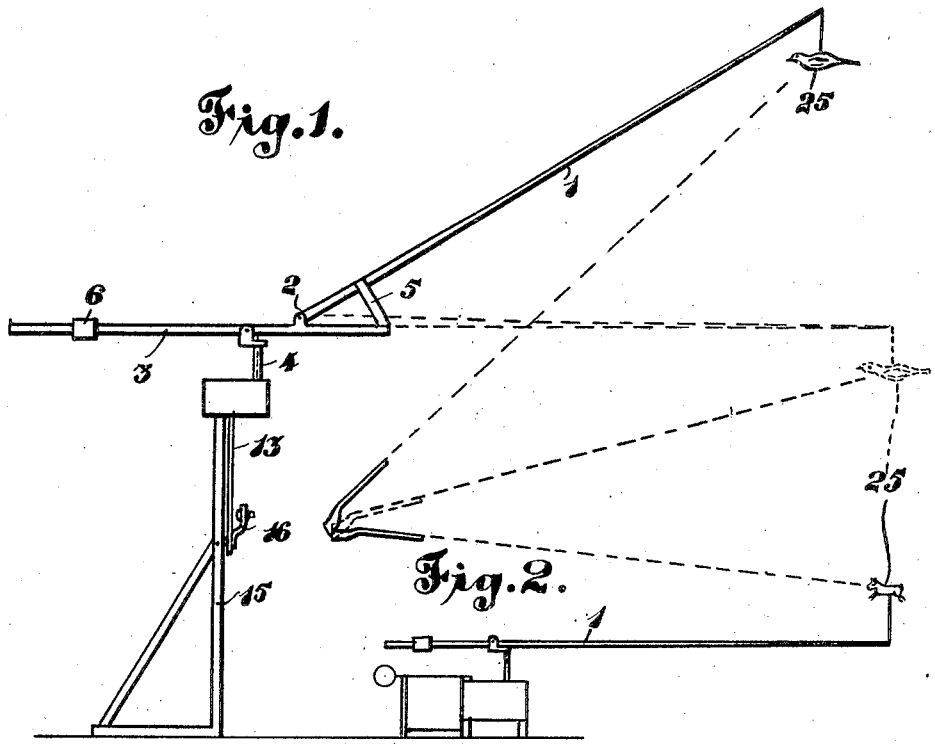
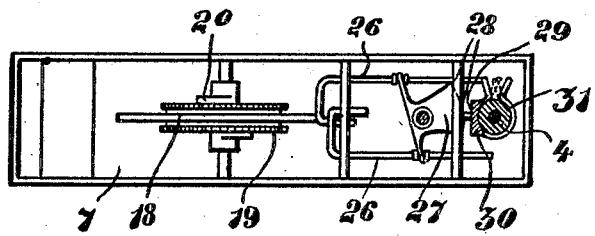

Aug. 7, 1923.                                              1,463,931
                          A. N. TUCKER
   APPARATUS OR DEVICE FOR USE WHEN TEACHING OR PRACTICING SHOOTING,
                   PARTICULARLY GAME SHOOTING
                     Filed June 27, 1921         2 Sheets-Sheet 2
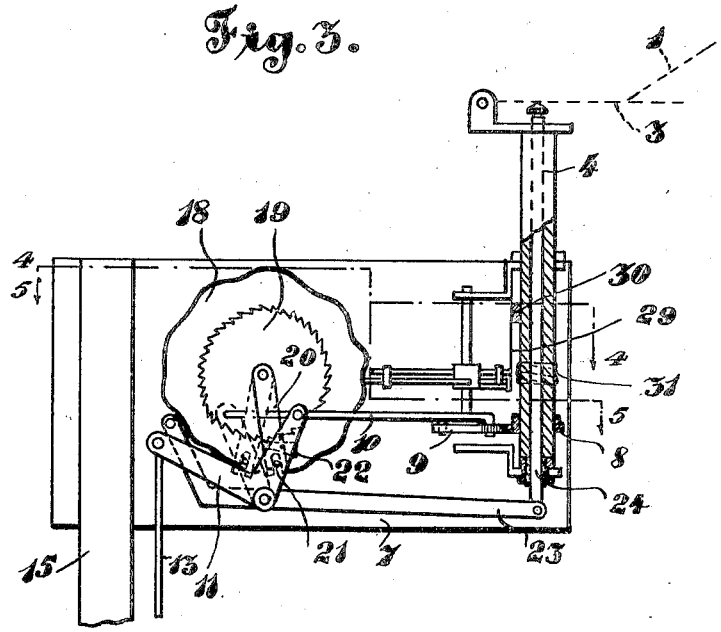
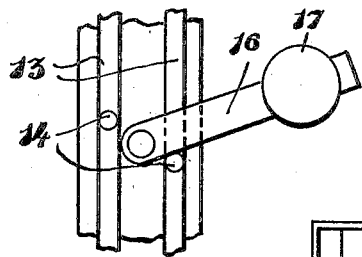
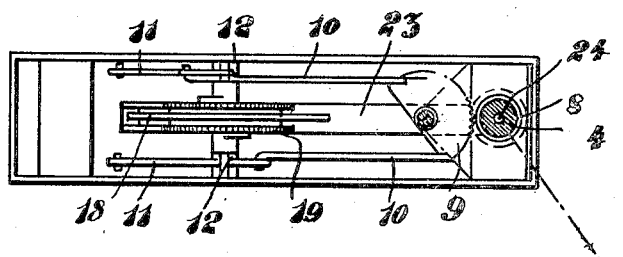

Patented Aug. 7, 1923.

1,463,931

UNITED STATES PATENT OFFICE.

ALBERT NAPOLEON TUCKER, OF GERRADS CROSS, ENGLAND.

APPARATUS OR DEVICE FOR USE WHEN TEACHING OR PRACTICING SHOOTING, PARTICULARLY GAME SHOOTING.

Application filed June 27, 1921. Serial No. 480,928.

*To all whom it may concern:*

Be it known that I, ALBERT NAPOLEON TUCKER, a subject of the Kingdom of Great Britain, residing at Littlehaye, Bulstrode Way, Gerrads Cross, in the county of Buckinghamshire, England, have invented certain new and useful Improvements in Apparatus or Devices for Use When Teaching or Practicing Shooting, Particularly Game Shooting, of which the following is a specification.

The present invention has relation to a new or improved apparatus or device for use when teaching or practicing shooting, particularly game shooting, and the invention has for its object primarily to enable the sportsman to improve his shooting and to readily detect errors which cannot be detected in the field. To this end a representation of a bird, rabbit or other object is mounted upon a radial arm, rod or like member adapted to be mechanically oscillated to move the representation through the arc or substantially the arc of a circle, means being provided whereby the speed of the arm or like member and its representation is automatically varied and made irregular as also the path or movement of the arm and representation, and suitable brake mechanism is provided, whereby the said representation has uncertain or somewhat erratic movements similar to those of the live bird or animal. A number of representations may be suspended from or carried by the arm, rod or like member to represent a covey of birds or number of animals.

The present apparatus is conveniently of such a size that same may be accommodated in a shed or any small open space and a net or screen suitably coated with lime wash or otherwise similarly prepared is preferably suspended behind the representations so that the shooter or his instructor can detect the impact of the pellets against the mat or screen in relation to the position of the moving representation and so detect the nature of the errors in the shooting. The size of the bird or animal and its speed are preferably in substantially correct relation to the size of the live bird or animal and its speed, having regard to the reduced range provided by the oscillatory arm of the apparatus. For example, supposing the representation to be held five yards from the shooter by the oscillatory arm a bird having a wing-span of two inches would approximately represent a living bird having a wing-span of sixteen inches at about 40 yards a normal range for sportsmen. Further, supposing the live bird flies "across the gun" for a given distance in say four to ten seconds, a similar number of seconds should be occupied by the moving representation traversing a lesser distance on the oscillatory arm, so that the angle through which the arm moves is substantially equal to the angle through which the sportsman's gun would move if he sighted the bird along the said given distance.

Conveniently the radial oscillatory arm, rod or the like is hingedly connected at its rear extremity to a rotatable pillar or tube and a vertical rod controlled by a suitable rotating cam wheel is adapted to impart an undulating movement to the arm during its traverse for the purpose aforestated. Brake or damper mechanism is preferably incorporated so that the arm does not travel at a uniform speed but a variation in said speed takes place. The radial oscillatory arm is adjustable in a vertical plane for enabling the birds to be elevated to represent pheasants or slightly lowered to represent partridges or still further lowered to substantially a ground level for rabbit or like representations. In the case of birds the representations are preferably suspended and in the case of rabbits same are supported from beneath. The radial oscillatory arm preferably operates in a complete semi-circle and its operation may be effected or started by a weighted hand lever.

In order that this invention may be clearly understood and readily carried into practice, reference may be had to the appended explanatory sheet of drawings, upon which:

Figure 1 illustrates an embodiment of the present invention in elevation.

Figure 2 illustrates also in elevation the embodiment employed for use when practicing shooting rabbits or like animals.

Figure 3 is a sectional elevation of the hand-controlled operating mechanism for the oscillatory arm.

Figure 4 is a plan in section on line 4—4 of Figure 3, the lower or underneath mechanism being removed for the sake of clearness.

Figure 5 is a plan in section on line 5—5 of Figure 3.

Figure 6 illustrates the hand-operable lever for setting the oscillatory arm in motion.

In a convenient embodiment of the present invention the radial oscillatory arm or like member 1 hereinafter referred to as the radial arm is hingedly attached at 2 to a substantially horizontal arm 3 which is in turn hingedly connected to a rotatable pillar or tube 4. The radial arm 1 is mounted so as to be capable of adjustment in a vertical plane by the member 5 as illustrated in Figure 1 for the purpose aforestated and the horizontal arm 3 is provided with a suitable counter-balancing weight 6 so that there is a slight preponderance of weight by the radial arm and its representation or representations. The radial arm 1 and horizontal arm 3 may be constructed of jointed bamboo or other like substance. The rotatable pillar or tube is vertically mounted in a casing or box 7 for the operating mechanism in suitable bearings provided therein. A pinion or toothed wheel 8 is mounted adjacent the lower extremity of the pillar or tube 4 and is adapted to be operated by and is in mesh with a semi-circular toothed rack 9 hingedly or pivotally mounted on a suitable fixed vertical axis. This rack is in turn controlled by two operating rods 10 connected at opposite positions as illustrated, these operating rods are in turn each attached to a bell crank lever 11 hingedly mounted on fixed axes 12 and each bell crank lever is in turn provided with a vertically depending rod 13 each rod having a stud or projection 14 (Figure 6). These vertically depending rods may be disposed adjacent the vertical standard or frame 15 which carries the casing or box 7 containing the mechanism and a hand-operating lever 16 provided with a suitable weight 17 is pivotally connected to the standard or frame 15 adapted to co-operate with the studs or projections 14 on the vertically depending rods 13.

By this mechanism it will be seen that by moving the hand operating lever 16 backwards and forwards through 45 degrees or substantially that angle the vertically depending rods 13 are alternately reciprocated and an oscillatory movement is imparted to the toothed rack 9 which in turn rotates the vertical pillar or tube 4 and the radial arm. This mechanism gives the necessary swing or traverse to the radial arm 1.

As aforestated it is desired to impart an irregular undulated movement to the radial arm and to this end a cam wheel 18 is employed mounted upon a suitable transverse axis in the casing or box. Mounted upon the same axis and attached to the said cam wheel are two ratchet wheels 19, and pawl lever arms 20 hingedly connected to the same axis are forked at their lower extremity and said forked parts are adapted to co-operate with projections 21 upon the bell crank levers 11 aforementioned. Weighted pawls 22 are provided upon the said arms 20 and are adapted to co-operate with the ratchet wheels 19 aforementioned. A hingedly mounted cam lever 23 is employed and conveniently has its fulcrum point concentric with and on the same axis as the hinged points of the bell crank levers 11, and the rear extremity of this cam lever has a roller adapted to co-operate with the cam wheel 18 and the front or foremost extremity of said lever is attached to or adapted to co-operate with a vertical rod 24 which extends through the rotatable pillar or tube 4 and projects slightly above same to co-operate with the horizontal arm 3 which in turn carries the radial arm 1.

With this mechanism it will be seen that upon the bell crank levers 11 being set in motion in the manner and for the purpose aforestated the cam wheel is rotated and a rocking movement is imparted to the cam lever 23 thereby imparting an irregular jumping or reciprocating movement to the vertical rod 24 which in turn elevates and depresses the radial arm and causes the representation 25 or representations at the extremity thereof to have an undulated or irregular flight or path.

In order that the speed of the representation 25 shall not be regular or uniform throughout the arc of the circle, damper or brake mechanism is employed in the casing or box 7 so as to alter the speed of the representation during its traverse. The damper or brake mechanism is particularly illustrated in Figure 4. Accordingly two sliding rods 26 are mounted in suitable guides or transverse members in the casing or box 7 and these rods are adapted alternately to co-operate with the cam wheel 18, an oscillating member 27 mounted on a suitable vertical axis has two arms each attached or co-operating with a sliding rod as illustrated, and said member has two eccentric faces 28 adapted to co-operate with a projection on a blade spring 29 attached within the casing or box 7 which blade spring has a brake block 30 adapted to co-operate with the rotatable pillar or tube 4. Rigidly attached to the rotatable pillar or tube is a helical spring 31 the extremities of which project and are adapted to co-operate with the foremost extremities of the sliding rods 26.

In operation it will be seen that the cam wheel 18 operates one of the sliding rods 26 and brings one of the eccentric faces 28 of the member 27 into engagement with the projection on the blade spring 29 to effect the desired brake or damping of the rotatable pillar or tube 4. Upon the latter being moved through substantially 180° the extremities of the spring 31 contact the extremity of the second sliding rod 26 and throw same into operation.

With this damper or brake mechanism it will be seen that as aforestated the speed is not uniform but varies to imitate as nearly as possible the flight or movement of the live bird or animal.

Figure 2 illustrates a modification in which the representation 25 is supported as in the case of rabbits and like animals, similar mechanism may be employed for operating the radial arm 1 but in this instance the rods 13 are disposed horizontally and the hand-operating lever 16 is adapted to operate in a horizontal plane on a suitable rear frame.

In order to support a covey of birds or number of animals it is only necessary to attach a rod to the extremity of the radial arm and suspend the birds therefrom and carry or otherwise support the representations thereon.

Obviously the mechanism for imparting the desired movement to the radial arm may be varied considerably without departing from the spirit of this invention. The radial arm may be if desired electrically operated or controlled or may be controlled by the rotation of a wheel by suitable pinion or gear wheel mechanism or any other means may be employed for imparting the desired movement to the said arm.

The representations which as aforestated are preferably proportional to life size according to the length of the radial arm may be in the form of birds, rabbits or the like and may be made of some substance easily broken on impact or may be of stamped metal suspended or supported by wire held by a spring clip, the impact of shot, if of sufficient number, causing them to be released from the spring clip and fall to the ground.

What I claim as my invention and desire to secure by Letters Patent is:

Apparatus of the kind described, comprising a radial arm, a target carried thereby, an element mounted for oscillation and by which said arm is carried, a vertically movable rod on said element, means to actuate said rod and cause the same to impart vertical oscillations to said arm, said means including a speed varying element, and a brake mechanism for said oscillatingly mounted element, actuated intermittently by said speed varying element.

In witness whereof I have hereunto set my hand.

ALBERT NAPOLEON TUCKER.